Jan. 25, 1955  A. H. BUCKLEY  2,700,200
DEADEND AND YOKE THEREFOR
Filed April 1, 1952
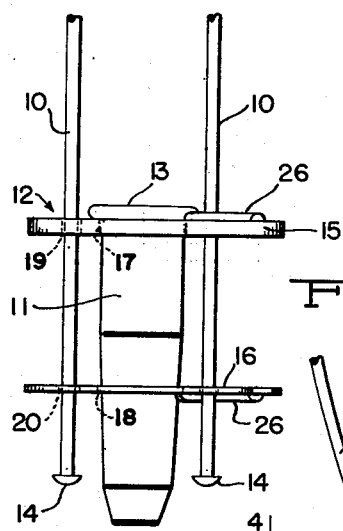
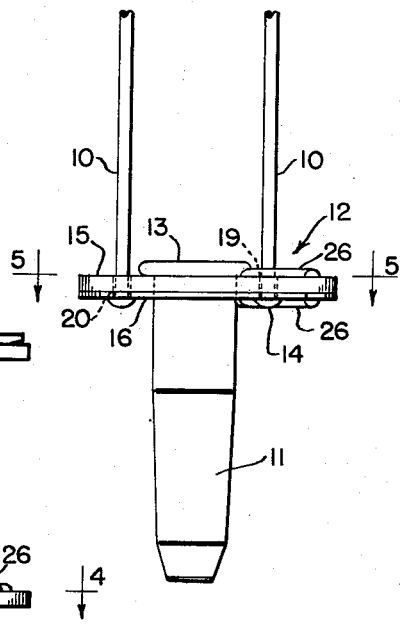
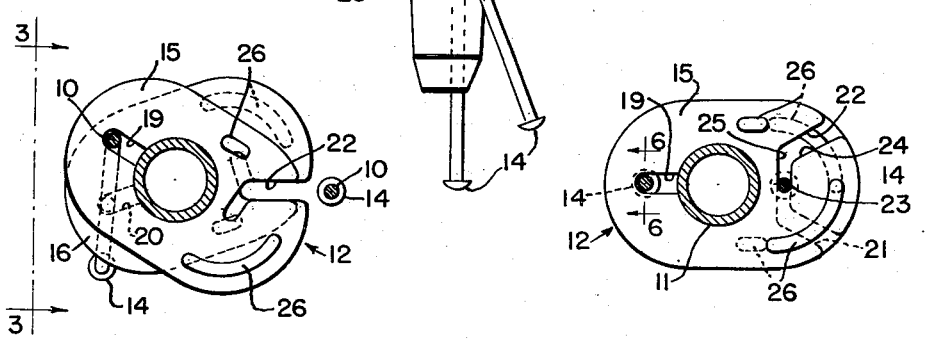
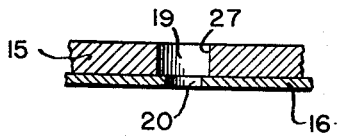
INVENTOR:
ARTHUR H. BUCKLEY
BY:
*Zabel & Gritzbaugh*
ATTORNEYS:

United States Patent Office 2,700,200
Patented Jan. 25, 1955

2,700,200
DEADEND AND YOKE THEREFOR

Arthur H. Buckley, Chicago, Ill., assignor to Reliable Electric Company, Chicago, Ill., a corporation of Illinois Application April 1, 1952, Serial No. 279,807

5 Claims. (Cl. 24—201)

This invention relates to improvements in wire supporting devices, of the type known as deadends, and in particular, to an improved deadend yoke.

A deadend comprises a wire gripping device known as a cartridge, a bail, which comprises a loop of wire by means of which the deadend is supported, and a yoke which connects the bail with the cartridge. The cartridge may be in the form of a metal sheet within which are disposed wire gripping jaws; it may be in the form of a compression sleeve; or, it may be any other device which firmly grips the line wire so that the tension of the line wire may be transmitted by the deadend to a suitable support, such as an insulator.

The cartridge is formed with a flange, and the ends of the bail, or bail wire, are provided with enlarged portions, the cartridge and the ends of the bail passing through suitable openings formed in the yoke so that the flange engages and interlocks with one surface of the yoke and the enlarged portions engage and interlock with the opposite surface of the yoke. Thus, the tension of the line wire is transmitted to the cartridge or wire gripping device, through the yoke to the bail, and thence to the insulator or other support.

It is an object of the present invention to provide a yoke which interlocks with both of the bail ends in such a manner as to permit the bail to be disconnected from its insulator or support without the necessity of removal of the cartridge from the yoke.

Heretofore, the bail ends have been received in slots formed in the yoke which communicate with the aperture in which the cartridge is received. Thus, the presence of the cartridge prevents lateral displacement and removal of the bail ends. To disconnect the bail, the cartridge must first be removed from the yoke, after which one end of the bail can be laterally moved into the opening so as to move the enlarged portion or head of the bail out of engagement with the yoke.

According to the present invention, one of the bail ends is secured in such a slot, which can be referred to herein as an internal slot, since it communicates with the cartridge aperture. The other end of the bail is secured in an external slot, so-called for the reason that the slot extends out to the periphery of the yoke. Thus, the last-mentioned bail end can be disengaged from the yoke without the necessity of first removing the cartridge.

In order to prevent inadvertent removal of the bail end from the external slot, the yoke is made of two washers, the external slots of which intersect each other to define an opening for receiving the bail end, the remaining portions of the slot being out of alignment with each other when the parts are maintained in normal operating position.

Another object of the present invention is to provide a yoke which may be fabricated from sheet metal, thereby providing a more economical yoke construction than that heretofore provided by the prior art.

A still further object is to provide an improved yoke in the form of two stampings of identical shape, thereby contributing to economy of manufacture.

Other objects, features and advantages will become apparent as the description proceeds.

With reference now to the drawings in which like reference numerals designate like parts:

Fig. 1 is an elevation showing a preferred embodiment of this invention, the parts being shown in separated condition;

Fig. 2 is a view similar to Fig. 1, but showing the parts in their operative position;

Fig. 3 is a view showing the parts in separated and twisted position, this view being indicated by the line 3—3 of Fig. 4;

Fig. 4 is a view taken along line 4—4 of Fig. 3;

Fig. 5 is a view taken along line 5—5 of Fig. 2; and

Fig. 6 is a detail view taken along line 6—6 of Fig. 5, but showing a modified form of the invention.

As shown in the drawings, the deadend comprises a bail 10, a wire gripping device or cartridge 11 and a yoke 12 which connects the two. The cartridge is formed with a flange 13 at its upper end, the terms "upper" and "lower," and related expressions, being used herein in a relative sense only. As indicated previously, the cartridge may be of a spring-biased jaw type, as shown herein, or it may be of the compression sleeve type, also provided with a flange corresponding to flange 13, or it may be of some other suitable type which serves to transmit the tension from the wire to the yoke, the exact type of cartridge not being critical to the invention.

The bail 10 is provided with enlarged end portions 14. In the particular embodiment shown, the bail is of the "hard wire type," which means that it is formed of a single strand wire or bar stock; preferably from stainless steel wire stock. The enlarged end portions 14 are provided by heading over the ends. However, any other suitable type of enlargement may be provided so as to insure proper interlocking action between the bail and the yoke, as will be pointed out hereinafter.

The yoke comprises two washers 15 and 16, both of which are provided with comparatively large openings or apertures 17 and 18, respectively, for receiving the cartridge 11. The washers are also provided with internal slots 19 and 20, respectively, which communicate with apertures 17 and 18. The apertures and internal slots are adapted to be aligned with each other when the two washers are in the position shown in Fig. 5, this being the normal operating position.

The washers are also provided with external slots 21 and 22 which are not aligned with each other when the parts are in normal operating position, but which intersect each other, when in this position, to define an opening 23 for the reception of one end of the bail wire.

In the embodiment shown, the external slots are each in the form of a dog leg, having a radially disposed portion 24 and a transversely disposed portion 25. The term "radial" is used with respect to the center of the apertures 17 and 18. Thus, when the washers are angularly displaced with respect to each other, as shown in Fig. 4, the radially disposed portions 24 will be in alignment with each other. Thus, one end of the bail wire may be moved inwardly, into the aligned radial portions, when the parts are in their Fig. 4 position. Then, when the two washers are twisted back into their normal operating position, as shown in Fig. 5, the bail wire is cammed in a transverse direction toward the bottom or intersecting portions of the two slots. In this position, it will be seen that the bail wire is securely interlocked with the yoke, assuming that the two washers are in juxtaposition to each other as shown in Fig. 2.

In the interests of economy, it is preferable that the two washers be of identical shape, so that they may be stamped from the same die. Then by inverting one of the washers with respect to the other, the desired relationship of the external slots is obtained. It will be observed that the internal slot is symmetrically disposed with respect to the longitudinal axis of the washer which is the axis of inversion.

Desirably, at least one of the washers is made of a hardened material, such as stainless steel, in order to resist tearing. The other washer, in this case the upper washer, can be stamped from aluminum, to give lighter weight and to reduce the cost. However, both washers may be made of stainless steel, or of other types of steel, if desired, and both could be made of aluminum or any other suitable material, provided that the material is sufficiently tough and strong with respect to the forces involved.

In stamping the washers, they may be provided with reinforcing ribs 26 which enhance their stiffness. When the washers are in juxtaposition with each other, these embossed ribs are on the outside or external faces of the juxtaposed washers, as shown in Fig. 2.

In initially assembling the deadend, the apertures and internal slots of the two washers are first aligned with each other; then one end of the bail is inserted through the aperture and moved laterally into the internal slots. These slots are of a width sufficient to accommodate the bail wire, but narrower than the diameter of the enlarged end portions 14. Then the cartridge 11 is inserted into the aligned apertures 17 and 18, thus interlocking all four elements of the deadend.

In installing the deadend, the washers are first separated from each other by a substantial distance, such as an inch, as shown in Fig. 1. The washers and the cartridge may have a fairly tight fit, but not so tight as to prevent manual manipulation of the parts into the Fig. 1 position. Then the free end of the bail is hooked through the insulator or other supporting device and brought down along side the separated washers.

The washers are preferably of elongated or non-circular shape so as to facilitate the twisting or angular displacement of one with respect to the other. This angular displacement will cause the secured end of the bail to be flexed or twisted, as shown in Fig. 3, as the radially disposed portions 24 of the external slots 21 and 22 are brought into alignment with each other. Then the free end of the bail may be inserted into the external slots and the washers twisted back to their normal operating position, as shown in Fig. 5. The lower washer is then moved upwardly into contact with the upper washer, and the upper washer is moved into contact with the flange 13. Of course, the latter steps are automatic since the tension of the line will automatically bring the parts into this Fig. 2 position.

If the bail is made of flexible stranded wire, it will be flexed in a somewhat different manner when the washers are angularly displaced from each other; however, the principle of operation is the same.

After the deadend has been installed, the interlocking action is not only positive, but it would be impossible to disconnect either end of the bail from the yoke, without first separating the washers. Of course, this cannot be done as long as there is any tension on the line wire.

It may not be necessary to bring the radial portions of the external slots into alignment with each other since the free end of the bail may be twisted or flexed to achieve insertion to a degree at least equal to the twisting or flexing of the secured end. Furthermore, there may be considerable variation in the shape of the external slots in instances where alignment of the outer portions thereof is not desired. The purpose of the radial disposition of said outer portions is to secure alignment, and the degree of alignment desired depends upon the stiffness of the bail. The arrangement shown herein is suitable for a comparatively stiff bail.

The outer end of the internal slot 19 may be somewhat enlarged as indicated by the reference number 27 in Fig. 6. Due to the greater thickness of the washer 15, a somewhat greater clearance between the slot and the bail wire is desirable in order to permit the angular disposition of the secured end of the bail wire, as shown in Fig. 3, incident to its flexing or twisting.

Although only a preferred embodiment of this invention has been shown and described herein, it will be apparent that various modifications and changes may be made in the construction without departing from the spirit of the invention as pointed out in the appended claims.

I claim:

1. A deadend comprising a bail having enlarged end portions, a wire gripping member having an external surface portion of circular cross section and a flange adjacent said surface portion, and a yoke for connecting said bail and said wire gripping member, said yoke comprising a pair of washers mounted on said external surface portion of said wire gripping member for angular and axial displacement with respect to each other, said washers having aligned internal slots and non-aligned external slots, one end of said bail being disposed within said aligned internal slots, and said external slots intersecting each other to define an opening for the reception of the other end of said bail, the enlarged end portions of said bail engaging the undersurface of said yoke, and the flange of said wire gripping member engaging the upper surface of said yoke.

2. A deadend comprising a bail having enlarged end portions, a wire gripping member having an external surface portion of circular cross section and an enlarged end portion adjacent said surface portion, and a yoke for connecting said bail and said wire gripping member, said yoke comprising a pair of washers, each having a circular aperture, said wire gripping member being received within said circular apertures so that said washers are mounted on said external surface portion for angular and axial displacement with respect to each other, said washers each having an internal slot communicating with said circular apertures, said circular apertures and internal slots being aligned with each other, one end of said bail being disposed within said aligned internal slots, and each of said washers having an external slot communicating with the periphery of said washer, said external slots intersecting each other to define an opening extending through said yoke, the other end of said bail being disposed in said opening, the remaining portions of said external slots being out of alignment with each other, the enlarged end portions of said bail engaging the undersurface of said yoke, and the enlarged end portion of said wire gripping member engaging the upper surface of said yoke.

3. A deadend as claimed in claim 2 in which said external slots are symmetrically disposed with respect to the axis of said internal slot.

4. A deadend as claimed in claim 2 in which the outer portions of said external slots are radially disposed with respect to the center of said aligned circular apertures.

5. A deadend as claimed in claim 2 in which at least one of said washers is provided with a re-inforcing rib extending into proximity to said external slot.

References Cited in the file of this patent

UNITED STATES PATENTS

| | | |
|---|---|---|
| 652,617 | Hotz | June 26, 1900 |
| 2,082,566 | Berndt | June 1, 1937 |